Figure 4:
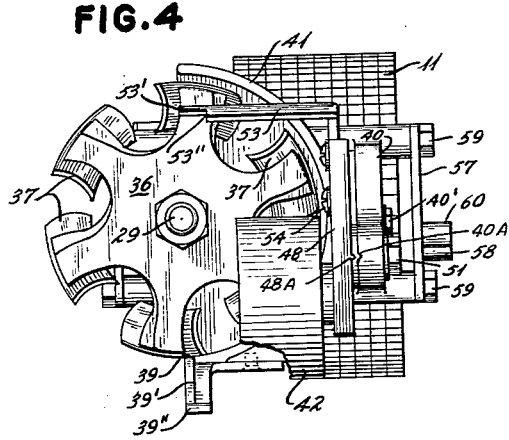

March 3, 1964
C. H. NICKELL
3,123,147
LAWN EDGER
Filed Dec. 26, 1961
2 Sheets-Sheet 1
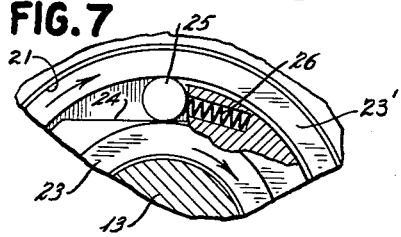
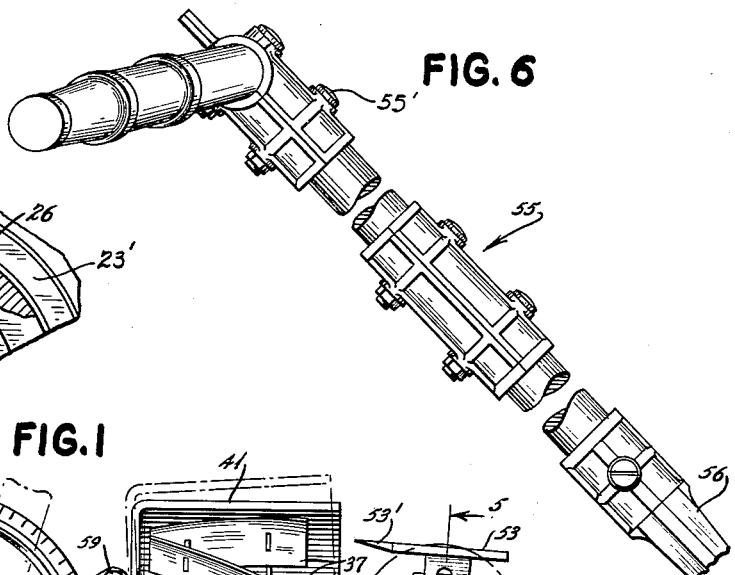
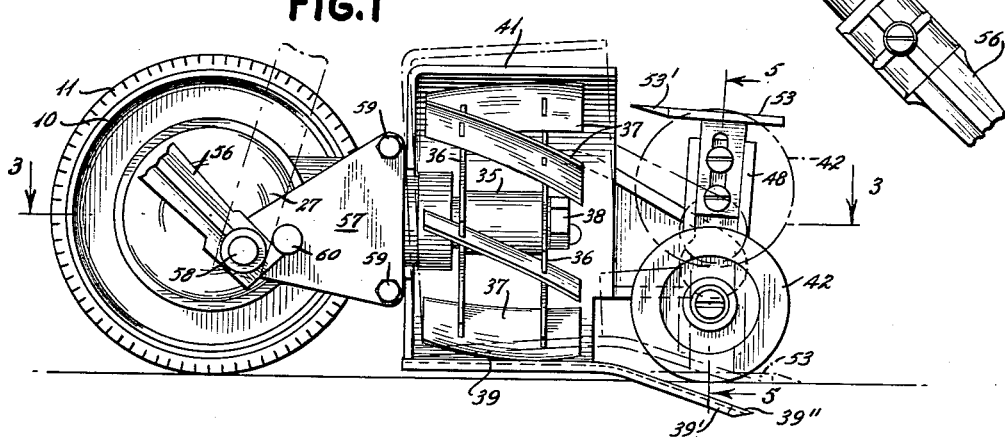
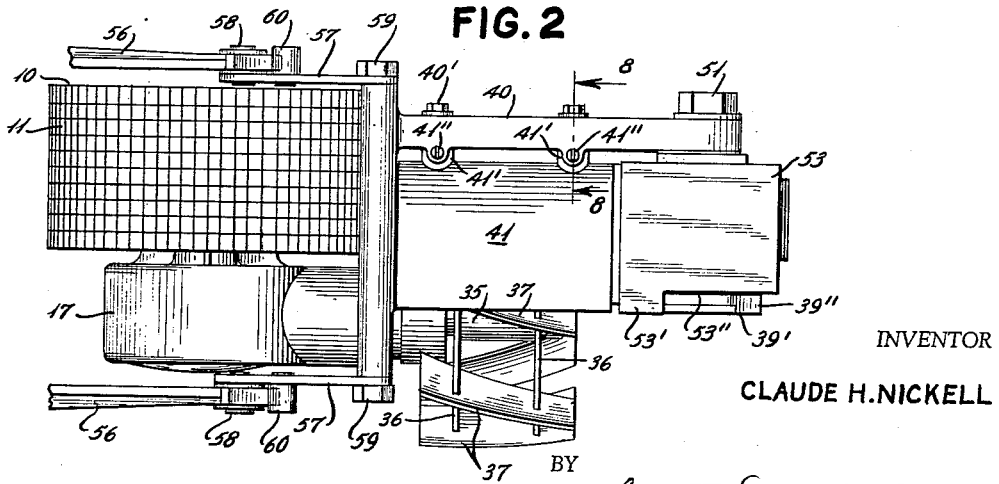
INVENTOR
CLAUDE H. NICKELL
BY
ATTORNEY March 3, 1964   C. H. NICKELL   3,123,147
LAWN EDGER Filed Dec. 26, 1961   2 Sheets-Sheet 2

INVENTOR
CLAUDE H. NICKELL

BY
ATTORNEY

United States Patent Office 3,123,147
Patented Mar. 3, 1964

3,123,147
LAWN EDGER
Claude H. Nickell, 17809 Oakwood Blvd.,
Dearborn, Mich.
Filed Dec. 26, 1961, Ser. No. 162,081
8 Claims. (Cl. 172—16)

This invention relates to the cultivation of grass and related growth on lawns, along walks, driveways and other surfaces, and to apparatus and equipment employed in maintaining the grass or other growth in such areas in neatly trimmed condition.

The invention relates particularly to apparatus or equipment for trimming the edges of grass or other growth to maintain the desired condition regardless of whether the edges to be trimmed are along curves or straight walks, driveways or other areas.

Machines for cutting grass and related growth along the edges of specific areas have been produced of various kinds including those drawn by animals, propelled manually or were self-propelled, and these machines have been manufactured at varying costs and they have been satisfactory and efficient in varying degrees and also have been subject to criticism, many of the machines having been expensive, cumbersome, difficult to operate, were inefficient, of short life, and it has been virtually impossible to maintain the cutting blades in the proper position and angular relation with respect to the grass or growth being cut. Also the cutting of prior machines has been such that the grass quickly grew to extend beyond the position cut presenting a ragged appearance in a relatively short time.

It is an object of the invention to provide an improved highly satisfactory machine which can be readily produced inexpensively and used with a minimum of attention and effort, which satisfactorily will perform the function for which it was designed and produced with the growth cut in a manner to retain its newly cut appearance for a maximum period.

Another object of the invention is to provide a manually operated edger having a maximum usefulness in cutting grass or other growth along curbs, sidewalks, driveways, roadways and the like in which the adjacent surfaces are at varying elevations and by which the cut grass or growth is deposited on the adjacent grass instead of on the walks, driveways or the like, making it possible to trim before mowing instead of thereafter.

A further object of the invention is to provide an edger having a relatively wide tread drive wheel for maximum traction, a forward guide member to facilitate the maintenance of the machine in line of the proper cutting position, with a transverse reel type cutter therebetween, with a combination pickup and guide for the grass or other growth cut with the forward portion of the device rotatable to accommodate either close or spaced working conditions, as well as a handle by which the traction roller will serve as a fulcrum for the raising and lowering of the cutting reel.

Another object of the invention is to provide an edger of the character indicated having a multi-bladed cutting member in which the individual cutting blades are related in a manner to provide a helical path and in the proper relation to the cutter bar mounted for angular adjustability relative to the cutter blade carrying shaft.

Another object of the invention is to provide a guard or shield at one side of the rotatable cutting element to serve the dual function of preventing injury by contact with the blades and to deflect the grass or other vegetation cut so that it will be thrown back on to the grass and not on the sidewalk or other surface on which the driving or stabilizing wheels are moving and later can be picked up by the regular mower.

Another object of the invention is the combination of the guide element with the front stabilizing wheel forwardly of the driving wheel and said wheel being adjustable.

Another object of the invention is a machine which is economical to manufacture, sturdy and longlasting device capable of rendering satisfactory service over a long period of time with a minimum of adjustment and upkeep.

Figure 5:
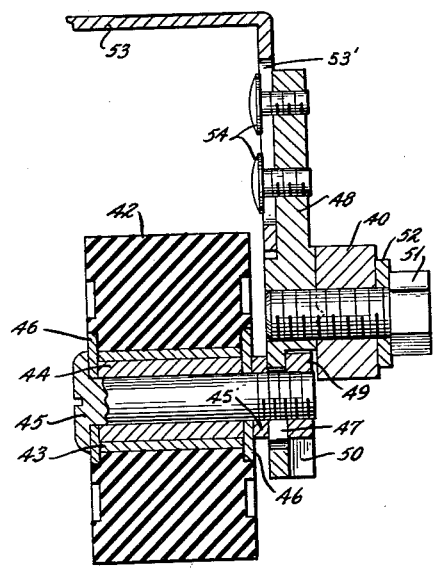
Figure 3:
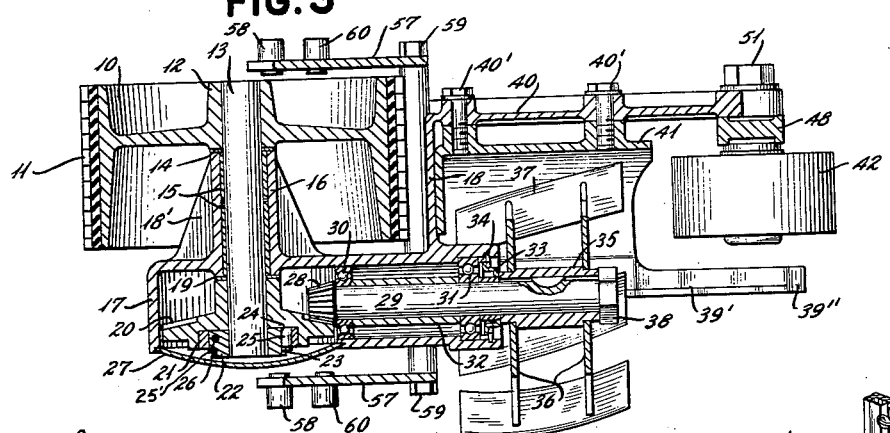
Figure 8:
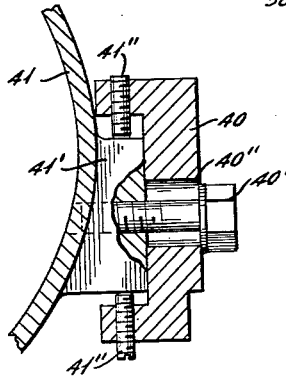

Other objects and advantages of the invention will be apparent from the following description taken in conjunction with the accompanying drawings in which:

FIG. 1 is a side elevation illustrating one application of the invention;
FIG. 2, a top plan view;
FIG. 3, a horizontal section on the line 3—3 of FIG. 1;
FIG. 4, a front elevation;
FIG. 5, a section on the line 5—5 of FIG. 1;
FIG. 6, a side elevation of the handle;
FIG. 7, a fragmentary view of the clutch;
FIG. 8, a section on the line 8—8 of FIG. 2; and
FIG. 9, a detail perspective of the support shoe.

Briefly stated, the invention is an edger for lawns and comprises a traction drive wheel or roller with a relatively wide tread mounted on a shaft to which is pivoted a manipulating handle by which the device may be propelled and on such shaft is mounted a combination frame and housing for the driving parts, such frame including a forwardly extending shaft driven by a bevel gear and a one-way clutch from the shaft of the driving wheel and on the front portion of the forwardly extending shaft is mounted a cutting reel which rotates transversely of the axis of the machine and forwardly of which is an adjustable guide wheel or skid.

Referring to the drawings in FIG. 1 is disclosed a side elevation of the machine which includes a rear driving wheel or roller 10 with a relatively wide tread 11 for providing substantial traction with a surface along which the same is operated, whether it be along a walk, driveway, or other surface. The driving wheel or roller 10 is provided with a hub 12 in which is fixed an axle or shaft 13 (FIG. 3). A thrust washer 14 is mounted on the shaft next to the hub 12 and such shaft 13 receives a pair of bearing sleeves 15, such as for example oil impregnated bearings not requiring lubrication. A sleeve 16 is mounted on such bearings and forms a portion of a transmission housing or gear casing 17 and frame 18, the sleeve 16 and transmission housing 17 having reinforcing webs 18'.

Within the hollow transmission housing 17 on the shaft 13 is provided a thrust washer 19 which fits between the casting of the transmission housing or gear casing 17 and a bevel gear 20 mounted for free rotation on the shaft 13.

The outer end of the bevel gear is provided with a recessed annular raceway 21 adapted to receive the elements of a one-way clutch 22. These elements (FIG. 7) preferably consist of an inner clutch member 23 secured in driving relation to the shaft 13 and an outer clutch member 23' secured to the gear 20. The inner member 23 has a plurality of circumferentially spaced cam surfaces 24 to receive rollers 25. The one-way clutch 22 permits free rotation of the bevel driving gear 20 in one direction but insures driving engagement in the opposite direction.

A plurality of springs 26 are employed yieldingly to urge the rollers 25 along the cam surfaces 24 toward the minimum clearance position so that when the shaft 13 is moved in the driving direction relative to the bevel gear 20, the rollers 25 lock the clutch elements to effect a wedging or driving connection between the gear 20 and the shaft 13. In order to prevent endwise movement of the rollers 25, a guard or retainer 25' (FIG. 3) is secured to the inner clutch member 23 and has an outwardly extending flange to maintain such rollers in position.

A closure plate 27 is pressed into the counterbore of the housing 17. In assembling the device the housing is filled with lubricant prior to the application of the closure plate 27. Thus the one-way clutch assembly may be lubricated for life and since the bushings 15 are of the oil impregnated type, they will not require lubrication for the normal life of the assembly, thus insuring a permanent lifetime lubrication of the device.

The bevel driving gear 20 meshes with and drives a pinion 28 formed on or added to the end of a shaft 29 mounted in bearings 30 and 31 with a spacer 32 therebetween. It is noted that the thrust washers 14 and 19 also function as shims to maintain the pitch line contact betwene the bevel gear 20 and the pinion 28. The bearing 31 is provided with a recess in which is received an oil seal 33 and such bearing is held in place by a snap ring 34.

On the outer end of the shaft 29 beyond the oil seal 33 is mounted a blade assembly including a hub 35 which supports a pair of mounting portions or spiders 36. Multiple spirally arranged cutting blades 37 are welded or otherwise attached to the spiders 36 in such a manner that the blades are curved or spirally disposed from end to end and are mounted in equally spaced relation about the hub 35 providing a helix in order that the cutting edges of the blades will be disposed at an angle to the cutoff position. The hub 35 preferably is keyed to the shaft 29 and the blade assembly is held in place thereon by a nut or retainer 38 engaged with threads on the outer end of the shaft 29. When the blade assembly is rotated by the shaft 29, the blades move rearwardly across a shearing member 39 to insure a scissors action as the cutting edge of the blade passes the edge of the shearing member. The blade assembly may be removed by removing the nut 38 and sliding the blade assembly off of the shaft 29 after which the snap ring 34 may be removed in order to remove the shaft 29 with the pinion 28 on its inner end along with the bearings 30 and 31 and the sleeve 32.

The shearing bar or member 39 has an angular forwardly depending extension 39′ and has at its forward extremity a carbide tip 39″. The extensions 39′ serves as a guide and as a prong to pick up or elevate blades of grass or other growth with which the extension 39′ comes in contact.

As the cutting reel rotates counter-clockwise, when viewed from the front of the machine, the point of contact between the rotary blade 37 and the shearing bar 39 is at a forward point on the cutoff member 39 equal to the front or leading edge of the rotary blade and as the blade continues to rotate the point of contact moves rearwardly the full length of the rotary blade for example approximately 2½″ in the machine herein illustrated and described. During this rearward movement of this point of contact between the rotating blade and the shearing bar the vehicle moves forwardly approximately one-half the distance. It thus has been determined that the rearwardly moving point of contact has a linear speed greater than that of the machine and in fact in excess of twice the forward ground speed of the machine. The grass or other growth actually is merely stationary when the cutting is being done so that the machine does not pull the grass or roots. This result is attained as a result of the combination of drive wheel circumference and gear ratio. Any increase in drive wheel diameter must include a higher gear ratio and the reverse. Maintaining the same cutter reel diameter and increasing the drive wheel diameter and gear ratio involves the same horsepower input and a very short void or non-cutting area results because of these conditions since during this non-cutting period the grass or other growth reaching the cutting edge of the shear bar 39 is free to slide along such bar, thus substantially eliminating this non-cutting area which is an important feature of the present invention.

Any number of blades may be employed, six having been found satisfactory, these being set at any desired angle and driven by the bevel and pinion gear arrangement to insure clean crisp cutting of the grass and other vegetation along the guide shearing member without undesirable bending or pulling of the grass to loosen the roots.

The forward portion of the frame is in the form of an L-shaped frame member 40 spaced transversely from and on the opposite side of the axis of the gear housing and shaft 29. To this frame member is secured a curved guard or deflector 41 which prevents contact with the cutter blades and receives and deflects grass and other vegetation cut and discharges it back onto the grass instead of on the sidewalk or other surface being edged. This arrangement prevents the grass from being crushed under the driving wheel, causing the latter to slip and not have traction necessary for the driving action. Also it eliminates the need for sweeping or cleaning the surface along which the edging operation has been performed and provides an additional advantage in that the edging operation may be performed before the lawn is mowed, the cutting from the edging being thrown back onto the lawn and being collected or scattered over the lawn at the time the lawn is mowed.

The shearing member 39 and its guide 39′ are fixed to the under side of the flat portion of curved member 41 and, in order to maintain a clean cut between cutting blades 37 and shearing member 39, the guard or deflector 41 is adjustably mounted and secured to frame 40 by cap screws 40′ threaded into projections 41′ of the deflector 41 and slidably mounted in slots 40″ in frame 40.

To maintain the proper relation between the cutting blades and shearing member, set screws 41″ are provided to engage the upper and lower edges of projections 41′ to secure the shearing member against vertical movement. The shearing member 39 which defines the position in which the grass is cut is offset laterally from the driving wheel, the extension 39′ following the edge of the walkway to provide a guide.

The frame of the machine is supported in the front by means of a guiding and stabilizing wheel 42, it being possible to maintain the rear and forward driving and guiding wheels on the surface of the sidewalk, curb or driveway and to insure good driving and guiding traction, whereupon an efficient satisfactory job of edging grass can be accomplished.

As illustrated in FIG. 5, the guide wheel 42 may be of resilient material with an oil impregnated metal sleeve or bushing 43 pressed, fitted or otherwise bonded within the bore of the guide wheel 42 and rotated therewith as a unit. The wheel assembly is rotatably supported on a stationary sleeve 44 fixed to the spindle bolt 45 between two thrust and dust shield washers 46 clamped between the head of bolt 45 and a spacer 45′. The spindle bolt or short shaft 45, on which the wheel assembly 42 is mounted, extends through a slot 47 in a bracket 48 of channel or other shape and is provided on its outer end with a square nut 49 slidable in a keyway 50 and having parallel sides to adjust the height of guide wheel 42.

A cap screw 51 extends through a washer 52 and a portion of the frame 40 into the bracket 48 thus rotatably mounting the bracket and the wheel carried by it. A skid 53 is adjustably mounted to the bracket 48 by means of adjusting screws 54 extending through a slot 53′ in the skid 53. By rotating the bracket 48 on the cap screw 51, the wheel 42 and the skid 53 alternately may be brought into depending position in contact with the surface, the wheel being adapted to roll along a smooth walk or driveway and the skid being adapted to slide along a flat surface, such as a blacktop driveway.

The adjustable features just described determines the distance of the carbide tip 39″ below the ground line.

The construction is such that the wheel and shoe or skid automatically move to the accurate indexing position regardless of whether the wheel or the skid is in the depending position. This is accomplished by complementary cooperating indexing elements 40A on the frame 40 and 48A (FIG. 4) on the bracket 48. By loosening the cap screw 51, the bracket 48, viewed from the right-hand side of FIG. 1, is rotated clockwise to change the skid or shoe from the upper position carrying the guide wheel to a lower position 180° from the original. The bracket 48 which supports both the guide wheel and the skid is provided with a pair of indexing elements 48A spaced approximately 180° apart so that one of such elements will engage element 40A when the bracket is rotated about the cap screw 51 on which the bracket is mounted. When the cap screw is loosened, the V index notch 40A moves to the right in FIG. 4 sufficiently to allow the V index projection 48A to permit the arm assembly 48 to be rotated to the right or clockwise 180° whereupon the cap screw may be tightened to secure the parts in properly indexed alignment. Thus the shoe or skid 53 will be in lowered position while the wheel 42 will be in elevated position.

In order to reverse the parts and locate the wheel in depending position and the skid or shoe in elevated position, the cap screw 51 is loosened and the assembly rotated in a counter-clockwise direction. In each rotation the wheel will clear the face of the cutting reel while the shoe will not. The axis of the wheel and spindle is parallel to the surface on which the edger rests and the shoe or skid is rotated and offset at an angle approximately 3½° clockwise of the spindle. When the shoe is in the lower position it will be substantially at an angle of 3½° to the surface on which the edger is supported, thus establishing a new ground line while the face of the shoe will be in line with and parallel to the lower outer circumference of the drive wheel. This location resulting from the vertical adjustment of the shoe, brings the bottom or heel of the carbide tip 39″ even with or slightly above the new ground line with the top or extended portion 53′ of the shoe 53 (FIGS. 2 and 9) located directly in front or ahead of the carbide tip 39″. The forwardly exposed beveled edge of the shoe or skid is located in a manner to pass under grass or other growth to elevate such grass or growth so that it travels over the members 39′ and tip 39″ to guide the material to the cut-off area.

Figure 9:
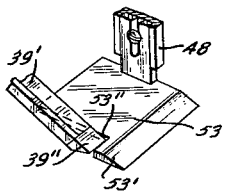

The angular portion 39′ and the tip 39″ of the shearing member are located in a cut away portion 53″ of the shoe or skid 53 (FIG. 9).

The handle 55 is composed of 3 parts duplicated and assembled in opposed pairs with an insert of wood or other material to prevent collapse when the parts are drawn together by bolts 55′. The lower end of the handle includes a fork of spaced arms or side member 56 each of which is pivoted to the apex or rear portion of a generally triangular bracket 57 by means of a stud 58. The base or large end of each of the brackets 57 is fastened by cap screws 59 to the main frame 40 of the machine. A second stud 60 is mounted inwardly of the apex of each of the triangular brackets 57 for engagement by one of the side members or arms and provide a limit stop in both directions. Force is applied to the handle in a downward direction and such force is transmitted both to the rear wheel 10 and to the front wheel 42 or shoe 53 whichever is in depending position.

When the handle is swung upwardly slightly beyond the vertical the stud 60 will be engaged as indicated by the dotted lines in FIG. 1 and when the handle is moved rearwardly downwardly in a reverse direction the end portions of the arms or side members 56 of the handle will engage the studs 60 and exert pressure in a direction to raise the entire machine about the rear wheel 10 as a fulcrum. The construction is such that the pivot points between the lower ends of the forks or sides of the handle is forward of the axis of the driving wheel and is underslung or below the center line of the axis of the driving wheel and the front wheel spindle. In view of the fact that force is applied ahead of the axis of the rear wheel and below the center line of such axis and the front spindle an advantage in leverage is obtained for steering the vehicle. If the force were applied through the handle at the center line of the rear axle greater effort would be required to change the course of the front wheel, right or left, since the front wheel cannot be turned to the left or the right but is mounted in a fixed position and therefore is not steerable. The structure described requires less effort to keep the guide tip 39′ riding against the curb or driveway because of the shorter distance from the pivot point to the guide tip.

Accordingly it will be understood that the present invention includes a device for neatly trimming the edge of a lawn along a walk or driveway and leaving the walk or driveway clean from the cuttings, it being provided with a guide to engage the edge of the walk or driveway and to straighten up the grass or other growth in such area so that it may be trimmed between the cutting bar and the driven blades, such device being light-weight and carried by wheels in bearings for ease in moving the same along the edge of the walk or driveway guided by an adjustable guide wheel and having a following drive wheel, a handle being pivotally attached to the frame.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:
1. A lawn edger comprising
   (1) a rear driving wheel having a hub,
   (2) an axle on which said hub is fixed,
   (3) a transmission housing mounted on said axle,
      (a) a closure plate for said transmission housing,
   (4) a bevel gear mounted for free rotation on said axle within said transmission housing,
   (5) a one-way clutch mounted on said axle in cooperative engagement with said bevel gear to permit free rotation of the bevel gear in one direction but to insure driving engagement in the opposite direction,
   (6) a pinion meshing with said bevel gear,
   (7) a shaft on which said pinion is mounted,
   (8) an oil seal mounted on said pinion shaft intermediate its ends,
   (9) a hub fixed on said pinion shaft exteriorly of said oil seal,
      (a) means for retaining said hub on said pinion shaft,
   (10) a rotary cutting element fixed to said hub,
      (a) said cutting element including spaced blade mounting discs,
      (b) a plurality of cutting blades fixed to the periphery of said discs,
         (1) said cutting blades being curved and twisted from end to end to provide a helix,
   (11) a frame mounted on said transmission housing,
   (12) a curved deflector mounted on said frame and providing a cover for said cutting element,
   (13) a shearing member fixed to the lower portion of said curved deflector in cooperative association with said cutting blades,
      (a) said shearing member being offset laterally to function as a guide,
   (14) supporting means adjustably mounted on the forward portion of said frame,
      (a) said supporting means including a bracket rotatably mounted on the forward portion of the frame,
         (1) a stabilizing wheel adjustably mounted on one end of said bracket,
         (2) a skid adjustably mounted on the opposite end of said bracket,
            (a) means for securing said bracket in fixed rotated position whereby either the stabilizing wheel or the skid may be positioned to engage the surface over which the machine is moved,
(15) a manipulating handle having a fork,
(16) a pair of brackets pivotally connecting said fork to said frame,
   (a) a member forming a limit stop mounted on each of said brackets,
   (b) said members being located in a position to engage the lower portion of the fork to raise the edger about the rear wheel as a fulcrum.

2. A lawn edger comprising
(1) a rear driving wheel having a hub,
(2) an axle on which said hub is fixed,
(3) a transmission housing mounted on said axle,
(4) a bevel gear mounted for free rotation on said axle within said transmission housing,
(5) a one-way clutch mounted on said axle in cooperative engagement with said bevel gear to permit free rotation of the bevel gear in one direction but to insure driving engagement in the opposite direction,
(6) a pinion meshing with said bevel gear,
(7) a shaft on which said pinion is mounted,
(8) a hub fixed on said pinion shaft and disposed generally parallel to the direction of travel of the edger,
   (a) means for retaining said hub on said pinion shaft,
(9) a rotary cutting element fixed to said hub,
   (a) said cutting element including blade mounting disc means,
   (b) a plurality of cutting blades fixed to the periphery of said disc means,
(10) a frame mounted on said transmission housing,
(11) a deflector mounted on said frame for said cutting element,
(12) a shearing means mounted on said deflector in shearing relation with said cutting blades,
   (a) the forward portion of said shearing means being offset downwardly to function as a guide,
(13) supporting means adjustably mounted on the forward portion of said frame,
   (a) said supporting means including a bracket,
   (b) a stabilizing wheel mounted on one end of said bracket,
   (c) a skid mounted on the opposite end of said bracket,
   (d) means for securing said bracket in position whereby either the stabilizing wheel or the skid may be positioned to engage the surface over which the machine is moved,
(14) and manipulating handle
   (a) having a portion located on each of the opposite sides of said driving wheel.

3. A lawn edger comprising
(1) a rear driving wheel having a hub,
(2) an axle on which said hub is fixed,
(3) a transmission housing mounted on said axle,
(4) a bevel gear mounted for free rotation on said axle within said transmission housing,
(5) a one-way clutch mounted on said axle in cooperative engagement with said bevel gear to permit free rotation of the bevel gear in one direction but to insure driving engagement in the opposite direction,
(6) a pinion meshing with said bevel gear,
(7) a shaft on which said pinion is mounted,
(8) a hub fixed on said pinion shaft,
(9) a rotary cutting element fixed to said hub,
   (a) said cutting element including blade mounting disc means,
   (b) a plurality of cutting blades fixed to the periphery of said disc means,
(10) a frame mounted on said transmission housing,
(11) a deflector mounted on said frame and disposed about said cutting element,
(12) shearing means mounted on said frame in cooperative association with said cutting blades,
   (a) the forward portion of said shearing member being offset laterally to function as a guide,
(13) supporting means mounted on the forward portion of said frame,
   (a) said supporting means including at least two earth contacting members adapted selectively to be disposed in contact with the earth,
(14) and a manipulating handle having a forked portion extending on opposite sides of said driving wheel.

4. A lawn edger comprising
(1) a rear earth contacting driving member and at least two front earth contacting supporting members,
(2) a frame carried by said rear and front members,
(3) a cutting reel mounted on said frame with the axis of rotation thereof being disposed generally parallel to the path of travel, and connected to be driven from said driving member,
(4) a guiding and shearing member mounted on said frame in operative relation to said reel,
(5) said front earth contacting supporting members being in diametrically opposed positions and adapted selectively to be disposed in contact with the earth, and
   (a) one of said members comprising a skid recessed to receive said guiding and shearing member.

5. A lawn edger comprising a frame, a drive wheel supporting one end of said frame, a stabilizing member supporting the opposite end of said frame, a rotary cutting element mounted on said frame with the axis of rotation disposed generally parallel to the path of travel of said edger, means drivingly connecting said drive wheel and said cutting element, said stabilizing member including a rotatable bracket, means for securing said bracket in rotated position, a ground engaging member mounted on each end of said bracket for selective engagement with the ground, an operating handle pivotally connected to said frame intermediate the axes of rotation of said driving wheel and said bracket and below a line drawn therebetween.

6. The structure of claim 5 in which said stabilizing member includes a wheel rotatably mounted on one end of said bracket.

7. The structure of claim 5 in which said stabilizing member includes a skid adjustably mounted on one end of said bracket.

8. The structure of claim 5 in which said stabilizing member includes a wheel rotatably mounted on one end of said bracket and a skid adjustably mounted on the opposite end of said bracket.

References Cited in the file of this patent

UNITED STATES PATENTS

| Re. 24,729 | Sturgis | Oct. 27, 1959 |
| 897,846 | Olds | Sept. 1, 1908 |
| 1,026,985 | Irwin | May 21, 1912 |
| 1,329,048 | Hoover | Jan. 27, 1920 |
| 1,652,012 | Johnson | Dec. 6, 1927 |
| 1,864,182 | Boyer | June 21, 1932 |
| 1,912,893 | Engel | June 6, 1933 |
| 2,039,029 | Pond | Apr. 28, 1936 |
| 2,093,413 | Brasted | Sept. 21, 1937 |
| 2,528,116 | Clemson | Oct. 31, 1950 |
| 2,715,810 | Beneke | Aug. 23, 1955 |
| 2,721,435 | Blair | Oct. 25, 1955 |
| 2,782,587 | Ott | Feb. 26, 1957 |

FOREIGN PATENTS

| 507,708 | Great Britain | June 20, 1939 |
| 824,645 | Great Britain | Dec. 2, 1959 |